(12) United States Patent
Beasley

(10) Patent No.: US 8,720,855 B2
(45) Date of Patent: *May 13, 2014

(54) BALL VALVE HAVING MULTIPLE MOVEABLE SEATS

(71) Applicant: Marvin E. Beasley, Houston, TX (US)

(72) Inventor: Marvin E. Beasley, Houston, TX (US)

(73) Assignee: Virgo Engineers, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/622,589

(22) Filed: Sep. 19, 2012

(65) Prior Publication Data
US 2013/0015384 A1 Jan. 17, 2013

Related U.S. Application Data

(63) Continuation of application No. 13/034,325, filed on Feb. 24, 2011.

(51) Int. Cl.
*F16K 25/00* (2006.01)

(52) U.S. Cl.
USPC .......................................... 251/192; 251/170

(58) Field of Classification Search
USPC ......... 251/192, 180, 316, 317, 170, 176, 171, 251/172, 174
See application file for complete search history.

(56) References Cited

U.S. PATENT DOCUMENTS

| | | | | | |
|---|---|---|---|---|---|
| 3,083,945 | A | * | 4/1963 | Shafer et al. ................... | 251/363 |
| 3,266,769 | A | * | 8/1966 | Shand ............................ | 251/172 |
| 3,592,440 | A | * | 7/1971 | McFarland et al. ........... | 251/170 |
| 4,155,536 | A | * | 5/1979 | Saiki ............................. | 251/332 |
| 4,327,895 | A | * | 5/1982 | Blumenkranz et al. ..     | 251/315.14 |
| 4,477,055 | A | * | 10/1984 | Partridge ...................... | 251/174 |
| 4,637,421 | A | * | 1/1987 | Stunkard ....................... | 137/327 |
| 4,667,926 | A | * | 5/1987 | Takeda et al. ................. | 251/170 |
| 5,419,532 | A | * | 5/1995 | Fan ............................... | 251/315.08 |
| 6,240,946 | B1 | * | 6/2001 | Beasley ........................ | 137/15.06 |
| 7,032,880 | B2 | * | 4/2006 | Scaramucci ................... | 251/172 |
| 7,635,113 | B2 | * | 12/2009 | Bearer et al. .................. | 251/181 |
| 2007/0278438 | A1 | * | 12/2007 | Scott et al. .................... | 251/172 |
| 2008/0230731 | A1 | | 9/2008 | Dalmasso et al. | |

OTHER PUBLICATIONS

Office Action for U.S. Appl. No. 13/034,325 mailed Oct. 17, 2012 (16 pages).

* cited by examiner

*Primary Examiner* — Eric Keasel
*Assistant Examiner* — Umashankar Venkatesan
(74) *Attorney, Agent, or Firm* — Osha Liang LLP

(57) ABSTRACT

Embodiments and methods are disclosed herein that relate to a valve assembly. The valve assembly includes a housing having a passage formed therethrough, and a valve ball having a through hole and disposed in the housing, in which the valve ball is rotatable between an open position that has the through hole aligned with the passage and a closed position that has the through hole misaligned with the passage. The valve assembly further includes a first seat having a first sealing surface and disposed in the housing adjacent to the valve ball, and a second seat having a second sealing surface and disposed in the housing adjacent to the first seat such that the first sealing surface of the first seat is disposed adjacent to the second sealing surface of the second seat. At least one of the first sealing surface of the first seat and the second sealing surface of the second seat comprises an arcuate surface.

23 Claims, 8 Drawing Sheets

BALL VALVE HAVING MULTIPLE MOVEABLE SEATS

CROSS-REFERENCE TO RELATED APPLICATIONS

The present application is a continuation of, and therefore claims benefit under 35 U.S.C. §120 to, U.S. patent application Ser. No. 13/034,325, filed on Feb. 24, 2011. This application is hereby incorporated in its entirety.

BACKGROUND OF DISCLOSURE

1. Field of the Disclosure

Embodiments disclosed herein generally relate to methods and assemblies that include a valve ball used to start and stop fluid flow. More specifically, embodiments disclosed herein relate to a valve assembly having a valve ball with multiple moveable seats to seal against fluid flow from the upstream and/or the downstream direction.

2. Background Art

The use of ball valves to start and stop the flow of fluids is well known in the art. Ball valves typically include a valve ball that is located between two seats in the middle of a passage. The valve ball has a through hole, and can be rotated between two positions. U.S. Pat. No. 5,246,203, issued to McKnight et al. ("McKnight"), incorporated by reference in its entirety, discloses an oilfield valve that incorporates a ball valve mechanism. The mechanics of a typical ball valve mechanism are demonstrated in the McKnight patent.

In a first position, as demonstrated in FIG. 1A, the through hole of the valve ball will align with the passage of the pipe or drill string. This position will generally allow complete and undisrupted fluid flow through the passage. The valve ball may then be rotated from this position into a second position, as demonstrated in FIG. 1B, to be misaligned with the passage of the pipe, thereby disrupting fluid flow. Each of the seats surrounding the valve ball, one upper seat and one lower seat, seal against the valve ball, not allowing flow between the valve ball and the seat. Thus, the valve ball, coupled with the two seats sealing against the valve ball, may stop fluid flow through the pipe passage when the valve ball is positioned in the closed position to misalign with the through hole passage by having the seats seal up against the valve ball. In FIG. 1B, a seal is made between the seats, 101 and 102, and the valve ball 105 to completely prohibit flow through the passage. The valve ball has the ability to seal against the seats to be effective against even the highest of pressures, allowing the arrangement to be used as a ball valve.

One issue with this type of ball valve arrangement is that when the valve ball 105 is in the second position, blocking flow through the passage, as seen in FIG. 1B, the valve ball 105 may not be able to effectively seal against the fluid flow, such as both in the upstream and downstream direction. For example, debris comes between the valve ball 105 and the seat 102, only sealing on the downstream seat 101 may be achieved. In such an example, if a fluid force is applied from the downstream direction, the debris may cause the valve to be unable to effectively seal between the valve ball 105 and the seat 102, thereby resulting in a leakage through the ball valve arrangement.

Further, because the valve ball 105 is usually fixed in all directions, except for rotating between an open and closed position, the seats 101 and 102 must be perfectly aligned with the valve ball 105 to ensure proper sealing engagement between the seats 101 and 102 and the valve ball 105. If the valve ball 105 shifts in any direction, such as towards either side with respect to the seats 101 and 102, then one or both of the seats 101 and 102 may lose effective sealing engagement with the valve ball 105.

For example, FIGS. 2A and 2B show a valve assembly having a seat 201 and a valve ball 205 disposed adjacent to each other with respect to an axis 200 of the valve assembly. In FIG. 2A, the seat 201 and the valve ball 205 are aligned with each other to ensure proper sealing engagement therebetween. However, in FIG. 2B, the valve ball 205 has shifted with respect to the seat 201 and the axis 200 such that the seat 201 and the valve ball 205 have lost proper sealing engagement therebetween. For example, as the seat 201 may only move along the axis 200 with respect to the valve ball 205, the seat 201 may not be able to move side-to-side and/or rotate with respect to the valve ball 205, such as having the seat 201 move radially with respect to the axis 200. As such, the seat 201 and the valve ball 205 may lose proper sealing engagement therebetween. Though the movement between the valve ball 205 and the seat 201 may be exaggerated and not drawn to scale in FIG. 2B, this type of movement and shifting between the valve ball 205 and the seat 201 may demonstrate how even minor movements may lead to a loss of proper sealing within a valve assembly, particularly within a valve assembly having metal-to-metal seals.

Accordingly, there exists a need to provide a ball valve assembly that may be able to identify and adjust for movements between one or more components within the valve assembly, particularly movement between one or more seats and the valve ball within the valve assembly, without compromising sealing integrity of the valve assembly.

SUMMARY OF INVENTION

In one aspect, embodiments disclosed herein relate to a valve assembly. The valve assembly includes a housing having a passage formed therethrough, and a valve ball having a through hole and disposed in the housing, in which the valve ball is rotatable between an open position that has the through hole substantially aligned with the passage and a closed position that has the through hole substantially misaligned with the passage. The valve assembly further includes a first seat having a first sealing surface and disposed in the housing adjacent to the valve ball, and a second seat having a second sealing surface and disposed in the housing adjacent to the first seat such that the first sealing surface of the first seat is disposed adjacent to the second sealing surface of the second seat, in which at least one of the first sealing surface of the first seat and the second sealing surface of the second seat includes an arcuate surface.

In another aspect, embodiments disclosed herein relate to another valve assembly. The valve assembly includes a housing having a passage formed therethrough about a first axis, and a valve ball having a through hole formed therethrough about a second axis, in which the valve ball is configured to rotate between an open position such that the first axis of the housing is substantially aligned with the second axis of the valve ball and a closed position such that the first axis of the housing is substantially misaligned with the second axis of the valve ball. The valve assembly further includes a stem extending through an opening formed in the housing and coupled to the valve ball such that the stem is configured to rotate the valve ball between the open position and the closed position, a first seat having a first sealing surface and disposed in the housing adjacent to the valve ball on one side of the valve ball, and a second seat having a second sealing surface and disposed in the housing adjacent to the first seat such that the first sealing surface of the first seat is disposed adjacent to the second sealing surface of the second seat, in which at least one of the first sealing surface of the first seat and the second sealing surface of the second seat includes an arcuate surface.

In yet another aspect, embodiments disclosed herein relate to a method to manufacture a valve assembly. The method includes disposing a first seat having a first sealing surface in a housing, the housing having a passage formed therethrough, and disposing a second seat having a second sealing surface in the housing adjacent to the first seat such that the first sealing surface of the first seat is adjacent to the second sealing surface of the second seat, in which at least one of the first sealing surface of the first seat and the second sealing surface of the second seat includes an arcuate surface. The method further includes disposing a valve ball having a through hole formed therein in the housing adjacent to the first seat such that the valve ball is rotatable within the housing between an open position that has the through hole substantially aligned with the passage and a closed position that has the through hole substantially misaligned with the passage.

Other aspects and advantages of the invention will be apparent from the following description and the appended claims.

DETAILED DESCRIPTION

Figure 1A:
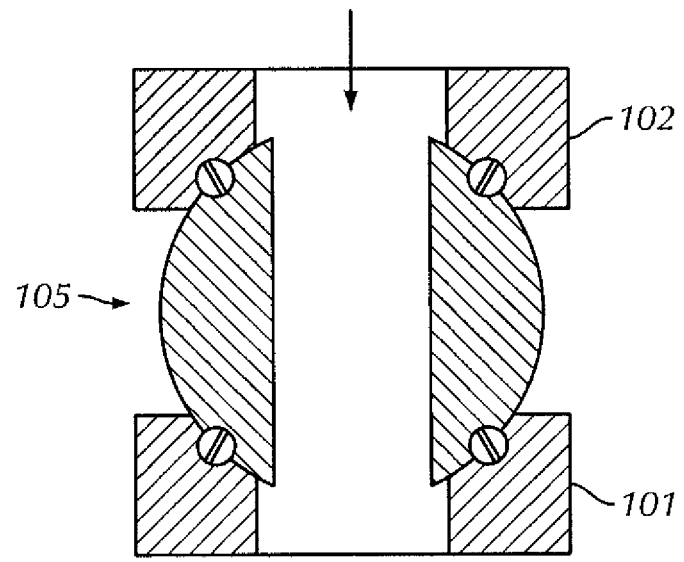
FIGS. 1A and 1B show cross-sectional views of a ball valve assembly.
Figure 1B:
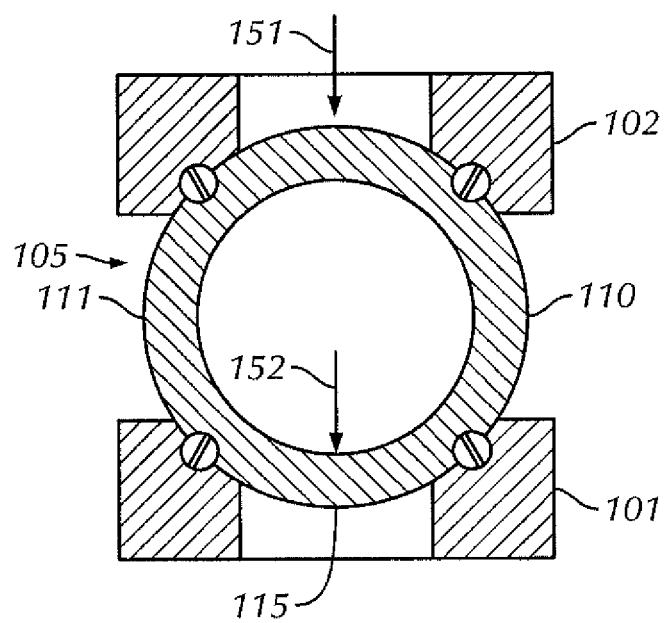

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description.

In accordance with various aspects disclosed herein, embodiments disclosed herein generally relate to a valve assembly, and particularly a ball valve assembly, that is used to start and stop fluid flow therethrough. The valve assembly may include a housing having a passage formed therethrough, in which the passage may be formed about a first axis. The valve assembly may further include a valve ball having a through hole formed therethrough, in which the through hole may be formed about a second axis. The valve ball is disposed within the housing such that the valve ball is rotatable between an open position and a closed position within the housing. In the open position, the through hole of the valve ball may align with the passage of the housing, such as by having the second axis of the through hole substantially align with the first axis of the passage, thereby generally enabling fluid flow therethrough. In the closed position, the through hole of the valve ball may substantially misalign with the passage of the housing, such as by having the second axis of the through hole substantially misalign with the first axis of the passage, thereby generally prohibiting fluid flow therethrough.

Further, the valve assembly includes a first seat having a first sealing surface, in which the first seat is disposed within the housing, and includes a second seat having a second sealing surface, in which the second seat is also disposed in the housing. The first seat and the second seat are disposed within the housing such that the first sealing surface of the first seat is disposed adjacent to the second sealing surface of the second seat. As such, at least one of the first sealing surface of the first seat and the second sealing surface of the second seat is and/or includes an arcuate surface. For example, the first seat and/or the second seat may include an arcuate surface as a sealing surface. In an embodiment in which one of the sealing surfaces of the first seat and the second seat comprises an arcuate surface, the other of the first sealing surface and the second sealing surface may be and/or include a tapered surface, such as by having an arcuate surface on the first seat and a tapered surface on the second seat.

Furthermore, the first seat is disposed adjacent to the valve ball, and the first seat and/or the second seat may be biased towards the valve ball. As such, the first seat and/or the second seat may be biased towards the valve ball, such as by using a biasing mechanism. In one embodiment, the biasing mechanism may be disposed, at least partially, between the second seat and the housing.

The valve assembly may further include a stem, in which the stem extends through an opening formed within the housing. The stem may then be coupled to the valve ball such that the stem may be configured to rotate the valve ball between the open position and the closed position within the housing. The valve assembly may also include one or more additional seats, such as by having a third seat (and/or a fourth seat) disposed on another side of the valve ball with respect to the first seat. As such, in one embodiment, during one direction of fluid flow against the valve ball, the valve ball may be configured to form a metal-to-metal seal with the first seat, and during the other direction of fluid flow against the valve ball, the valve ball may be configured to form a metal-to-metal seal with the third seat.

Figure 3A:
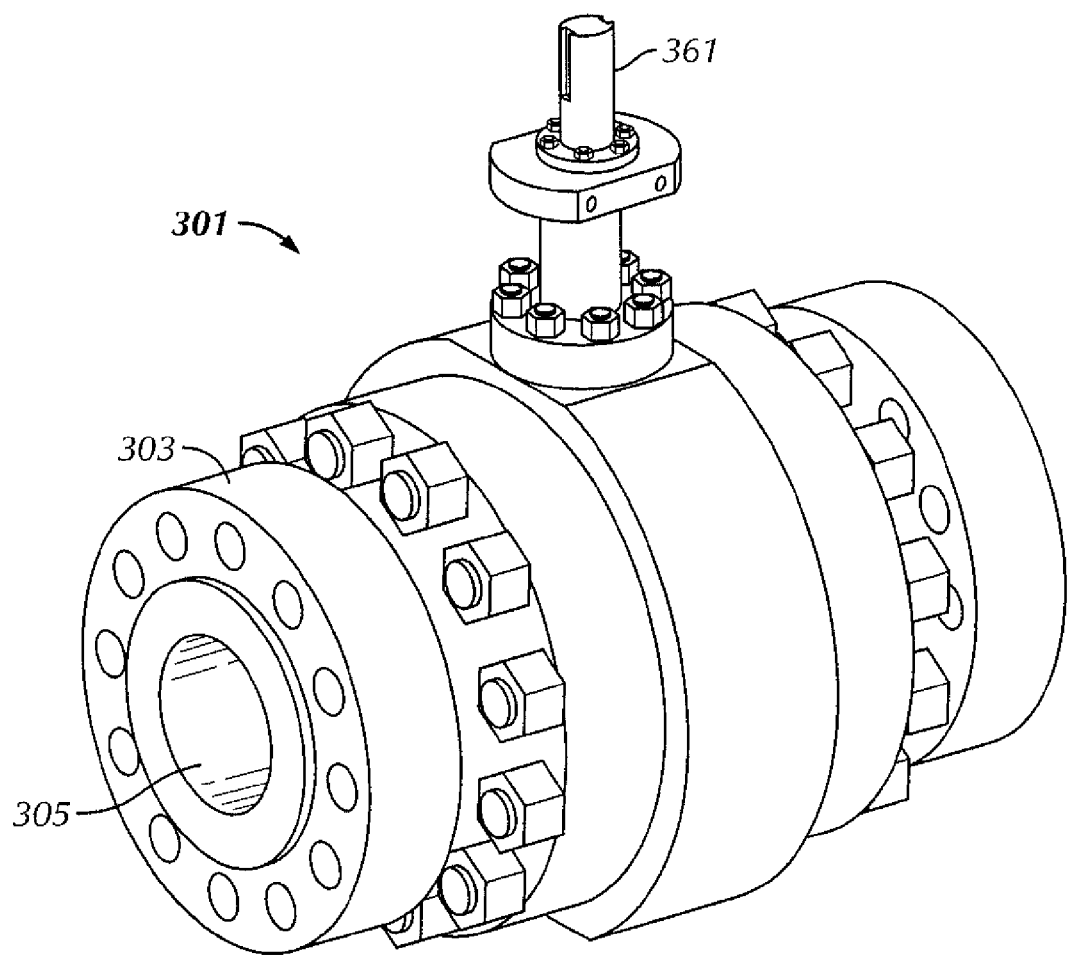
FIGS. 3A-3E show multiple views of a valve assembly in accordance with embodiments disclosed herein.
Figure 3B:
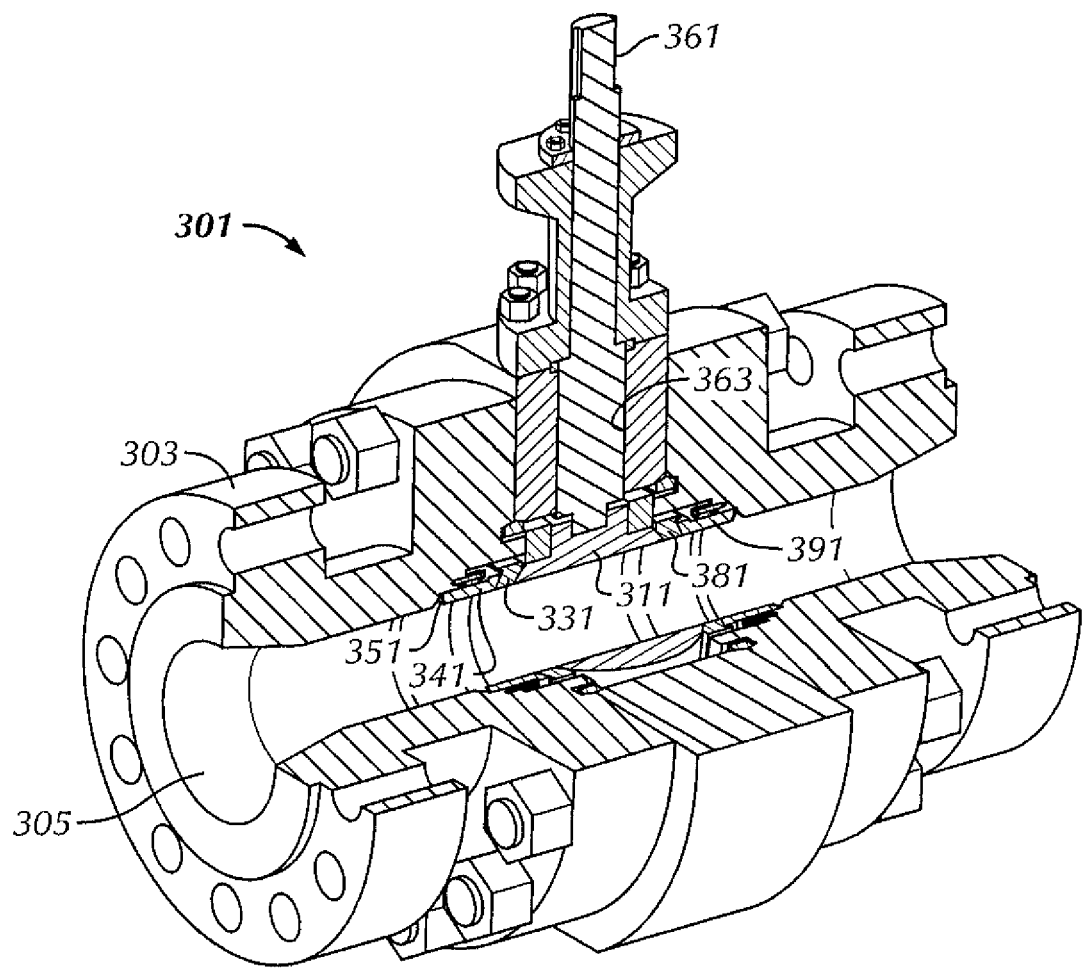
Figure 3C:
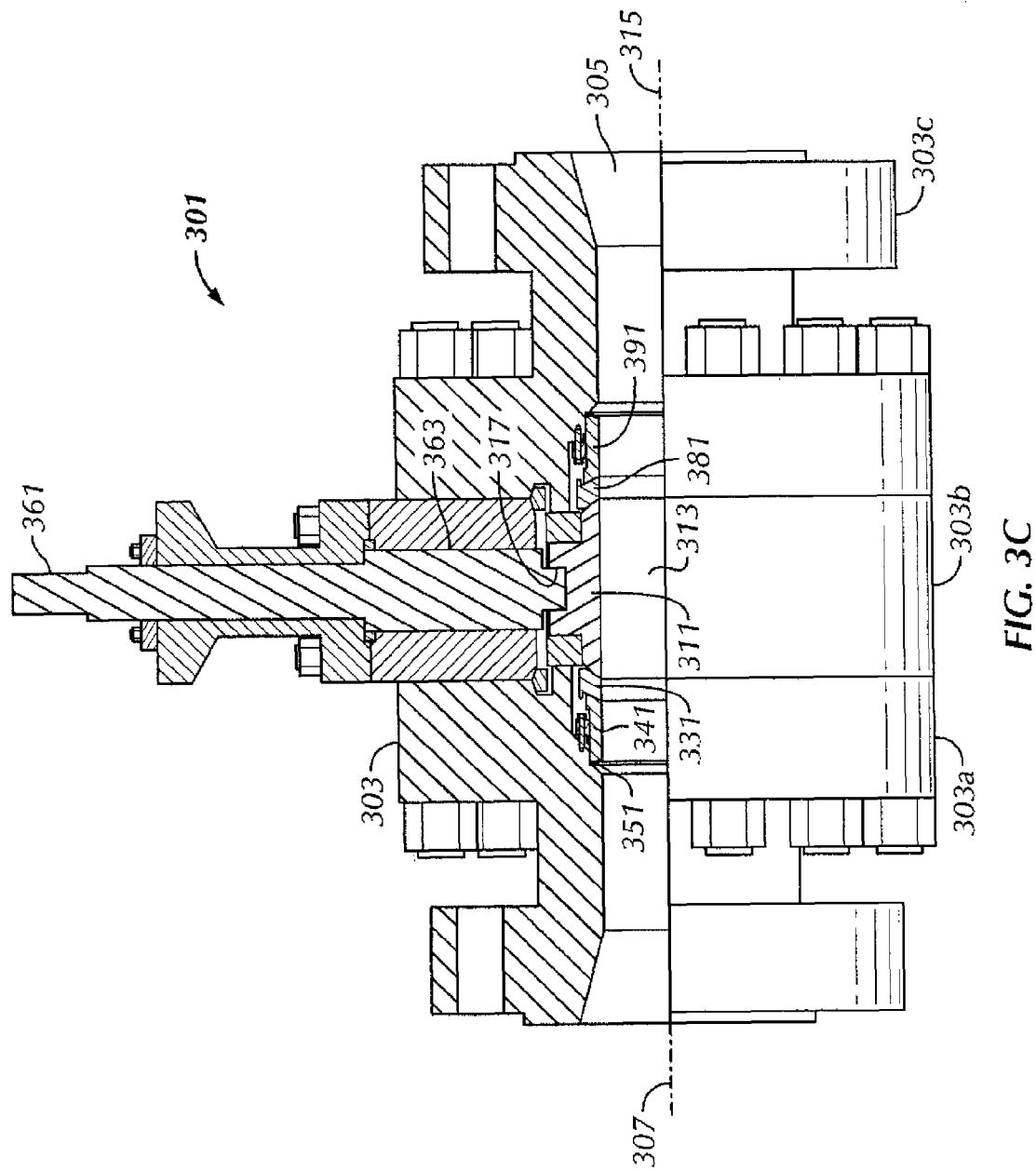
Figure 3D:
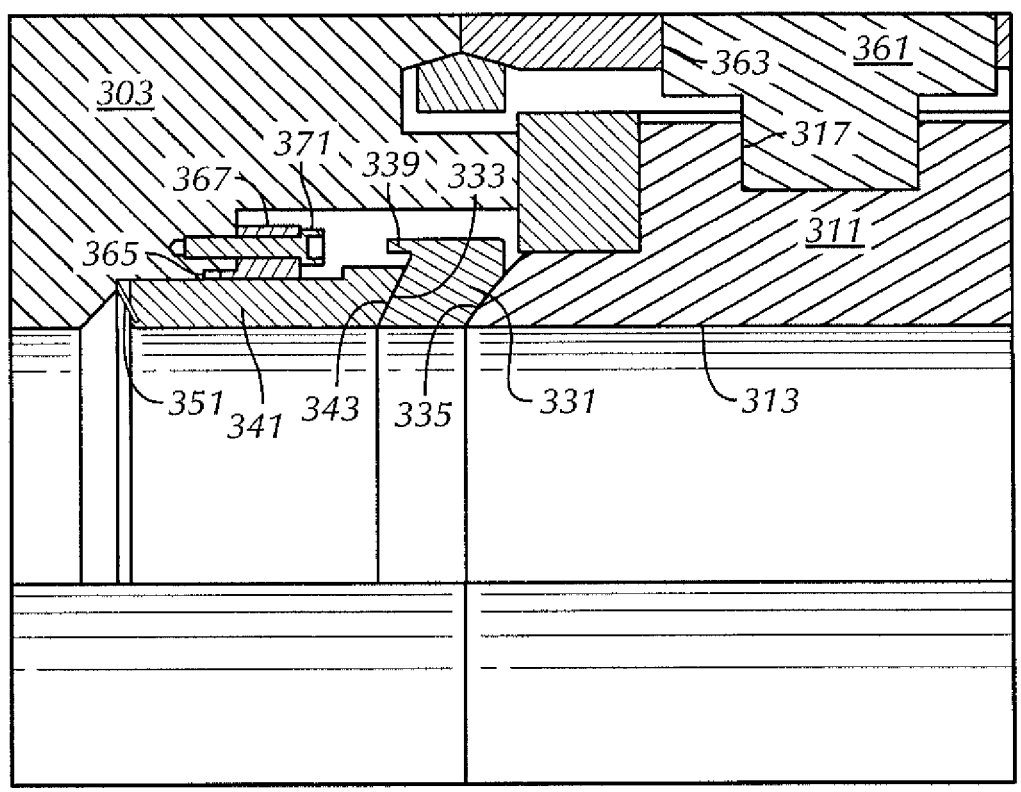
Figure 3E:
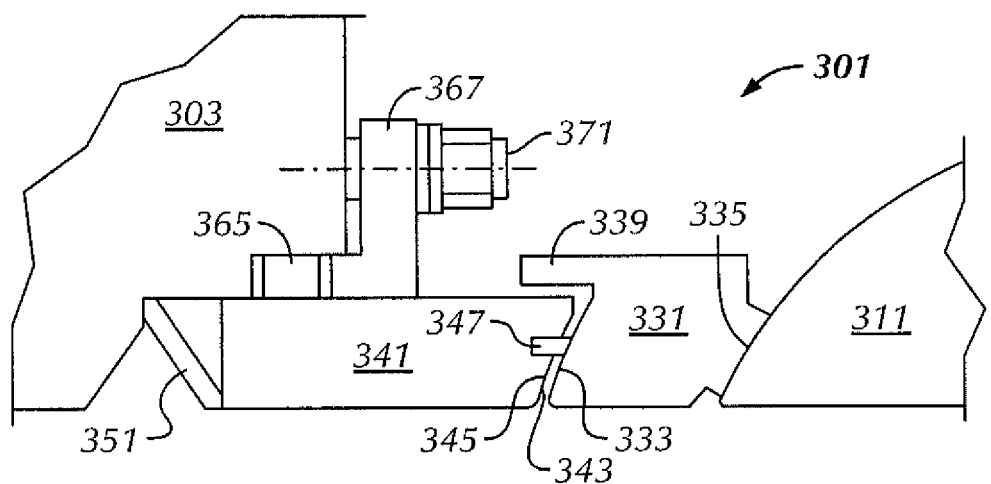

Referring now to FIGS. 3A-3E, multiple views of a valve assembly 301 in accordance with embodiments disclosed herein are shown. Specifically, FIG. 3A shows a perspective view of the valve assembly 301, FIG. 3B shows perspective sectioned view of the valve assembly 301, FIG. 3C shows a cross-sectional view of the valve assembly 301, FIG. 3D shows a detailed cross-sectional view of a portion of the valve assembly 301, and FIG. 3E shows a detailed cross-sectional schematic view of a portion of the valve assembly 301.

As shown, the valve assembly 301 includes a housing 303, in which the housing 303 has a passage 305 formed therethrough. Particularly, as shown in FIG. 3C, the passage 305 of the housing 303 may be formed about an axis 307 that extends through the housing 303. As such, and as shown in this embodiment, the passage 305 of the housing 303 may increase and/or decrease in diameter with respect to the axis 307 as the passage 305 extends through the housing 303 along the axis 307.

One having ordinary skill in the art will appreciate that, in accordance with one or more embodiments disclosed herein, the housing of the valve assembly may be formed as one monolithic structure, or, as shown in FIGS. 3A-3D, the housing 303 may be formed from portions attached to each other. For example, as shown particularly in FIG. 3C, the housing 303 may include a first portion 303A, a second portion 303B, and/or a third portion 303C. Those having ordinary skill in the art will appreciate that the housing of the valve assembly of the present disclosure may include more or less portions, as desired, and may be attached to each other, either permanently or temporarily, as desired.

Further, the valve assembly 301 includes a valve ball 311, in which the valve ball 311 has a through hole 313 formed therethrough. Particularly, as shown in FIGS. 3B and 3C, the through hole 313 of the valve ball 311 may be formed about an axis 315 that extends through the valve ball 311. As such, the valve ball 311 is disposed within the housing 303 of the valve assembly 301 such that the valve ball 311 is rotatable with respect to the housing 303. Specifically, the valve ball 311 is disposed within the housing 303 such that the valve ball 311 may be rotatable between an open position and a closed position with respect to the housing 303.

In the open position, as shown in FIGS. 3B-3E, the through hole 313 of the valve ball 311 may substantially align with the passage 305 of the housing 303, such as by having the axis 315 of the through hole 313 substantially align with the axis 307 of the passage 305. As such, when the valve ball 311 is in the open position, the valve assembly 301 will generally allow and enable fluid flow therethrough. In the closed position, the through hole 313 of the valve ball 311 may substantially misalign with the passage 305 of the housing 303, such as by having the axis 315 of the through hole 313 substantially misalign with the axis 307 of the passage 305. As such, when the valve ball 311 is in the closed position, the valve assembly 301 will generally prohibit fluid flow therethrough.

Referring still to FIGS. 3A-3E, the valve assembly 301 includes a first seat 331 and a second seat 341. As shown, the first seat 331 and the second seat 341 are disposed within the housing 303 of the valve assembly 301, in which the first seat 331 may be disposed adjacent to the valve ball 311 and the second seat 341 may be disposed adjacent to the first seat 331. Particularly, the first seat 331 may be disposed within the valve assembly 301 between the valve ball 311 and the second seat 341, and the second seat 341 may be disposed within the valve assembly 301 between the first seat 331 and the housing 303.

As shown, the first seat 331 and the second seat 341 may each include one or more sealing surfaces, in which the sealing surfaces may include an arcuate surface. For example, the first seat 331 may include an arcuate surface 333, and the second seat 341 may include an arcuate surface 343. As used herein, an "arcuate" surface may refer to a surface that has an arc or a curve formed thereon. One having ordinary skill in the art will appreciate that, though FIGS. 3A-3E show the first seat 331 and the second seat 341 each including arcuate surfaces 333 and 343, respectively, only at least one of the first seat and the second seat may need to include an arcuate surface. For example, in another embodiment, the first seat may include an arcuate surface, and the second seat may include a corresponding sealing surface, such as a tapered and/or an angled surface, as compared to an arcuate surface. As such, though embodiments disclosed herein discuss having two or more arcuate surfaces within a valve assembly, the present disclosure is not so limited and contemplates one or more embodiments having only one or more arcuate surfaces within a valve assembly.

Referring still to FIGS. 3A-3E, the arcuate surface 333 of the first seat 331 and/or the arcuate surface 343 of the second seat 341 may each be arched or curved with respect to the axis 307 extending through the housing 303. The arcuate surface 333 of the first seat 331 and the arcuate surface 343 of the second seat 341 may each have substantially the same arc or curve formed therein with respect to the axis 307 of the housing 303. For example, the arcuate surface 333 of the first seat 331 and the arcuate surface 343 of the second seat 341 may each have substantially the same radius with respect to the axis 307 of the housing 303, such as within a tolerance of about 10 percent, at least. Particularly, in one embodiment, the arcuate surface 333 of the first seat 331 and the arcuate surface 343 of the second seat 341 may be spherical surfaces, thereby having a similar arc, radius, and/or curve to a sphere. As such, having substantially the same radius may enable the arcuate surface 333 of the first seat 331 and the arcuate surface 343 of the second seat 341 to contact each other, and particularly have sealing contact therebetween. For example, as the arcuate surface 333 of the first seat 331 and the arcuate surface 343 of the second seat 341 come into contact and may have substantially the same radius with respect to the axis 307 of the housing 303, the arcuate surfaces 333 and 343 may develop sealing contact therebetween.

Further, the first seat 331 may be formed such that the first seat 331 may have sealing contact with the valve ball 311. For example, the first seat 331 may have another sealing surface 335 formed thereon, in which the sealing surface 335 may be used to develop sealing engagement with the surface of the valve ball 311. In one embodiment, the sealing surface 335 of the first seat 331 may be an arcuate surface, as shown, in which the surface of the valve ball 311 may correspond with the sealing surface 335 of the first seat 331. Those having ordinary skill in the art, however, will appreciate that the sealing surface of the first seat and the sealing surface of the valve ball, in addition to any other sealing surfaces within the valve assembly, may have different shapes, sizes, and configurations, without departing from the scope of the present disclosure, such as by having, in one embodiment, an angled and/or tapered surface for the sealing surface of the first seat and/or the sealing surface of the valve ball. Accordingly, the present disclosure contemplates other arrangements, structures, and configurations for a valve assembly, as compared to those only shown in FIGS. 3A-3E.

Furthermore, the second seat 341 may be formed such that the second seat 341 has sealing contact with the housing 303. For example, the second seat 341 may form a seal between one of the sides of the second seat 341 and the housing 303. A groove 345, as shown in FIG. 3B particularly, may also be formed with the second seat 341, in which a sealing member 347, such as a Grafoil® seal or other sealing member known in the art, may be disposed within the groove 345 of the second seat 341. As such, in the embodiment shown in FIG. 3E, the sealing member 347 may be disposed in the groove 345 on the arcuate surface 343 of the second seat 341 to provide an additional, or alternative, seal between the first seat 331 and the second seat 341.

The valve assembly 301 may further include a biasing mechanism 351, in which the biasing mechanism 351 may be used to bias the first seat 331 and/or the second seat 341 towards the valve ball 311. The biasing mechanism 351 may be disposed within the housing 303 of the valve assembly 301, and, in one embodiment, may specifically be disposed between the second seat 341 and the housing 303 of the valve assembly 301. This arrangement may enable the biasing mechanism 351 to be positioned between the housing 303 of the valve assembly 301 and the second seat 341, thereby enabling the biasing mechanism 351 to push against the housing 303 and bias the first seat 331 and the second seat 341 towards the valve ball 311. The biasing mechanism 351 may be, for example, a Belleville, as shown. However, those having ordinary skill in the art will appreciate that any other biasing mechanism may be used within the valve assembly, such a spring and/or an elastomeric member, without departing from the scope of the present disclosure. Further, the biasing mechanism is shown as disposed between one of the seats and the housing in FIGS. 3B-3E. However, those having ordinary skill in the art will appreciate that other arrangements may be used to bias one or more of the seats towards the valve ball in accordance with embodiments disclosed herein without departing from the scope of the present disclosure.

Referring still to FIGS. 3A-3E, the valve assembly 301 may include a stem 361. As shown, the stem 361 may extend through an opening 363 formed within the housing 303 of the valve assembly 301. Particularly, the stem 361 may extend through the opening 363 to couple to the valve ball 311 of the valve assembly 301, in which the stem 361 may be used to rotate the valve ball 311, such as rotate the valve ball 311 between the open position and the closed position with respect to the housing 303. For example, as shown, the valve ball 311 may have a recess 317 formed therein, in which the stem 361 may extend into and engage the recess 317 of the valve ball 311 to rotate the valve ball 311 between the open position and the closed position. As such, the stem 361 may be used to engage and rotate the valve ball 311 from the exterior of the housing 303 as the valve ball 311 is disposed within the housing 303.

The valve assembly 301 may also include one or more sealing members 365 disposed therein, such as to improve sealing capability of the valve assembly 301. For example, as shown in FIGS. 3A-3E, a sealing member 365 may be disposed adjacent to the second seat 341 and between the housing 303 and the second seat 341. As such, the sealing member 365 may be used to seal, at least partially, about the second seat 341.

A plate 367, such as a sealing gland, may be disposed adjacent to the one or more sealing members 365, in which one or more attachment members 371 may be used to attach the plate 367 to the housing 303. For example, as shown in FIGS. 3D and 3E, the attachment members 371, which may be bolts, as shown, or any other attachment member known in the art, may be used to attach the plate 367 to the housing 303, and further may be used to apply pressure to the sealing members 365 through the plate 367. Particularly, as shown, the attachment members 371 may be selectively tightened, as desired, to apply pressure to the sealing members 365 using the plate 367, thereby adjusting the sealing properties of the sealing members 365, as desired.

One having ordinary skill in the art will appreciate that a sealing member, in accordance with one or more embodiments disclosed herein, may be formed of and/or include any sealing material known in the art. For example, in one embodiment, a sealing member may be die formed, such as a die formed ring, and may be formed from or include Grafoil®, or any other sealing material known in the art. Further, those having ordinary skill in the art will appreciate that in addition, or in alternative, to the sealing member 365 and the sealing member 345, other sealing members may be included with and/or disposed within the valve assembly without departing from the scope of the present disclosure. Furthermore, to improve the sealing of one or more of the sealing members within the valve assembly, one or more washers, or similar mechanisms in placement and/or function, may be included within the valve assembly to improve the sealing capability of the valve assembly. For example, in FIG. 3E, one or more washers may be disposed adjacent to the sealing member 365, such as zero clearance washers, and one or more washers may be disposed adjacent to the attachment members 371, such as loaded washers.

As discussed above, the first seat 331 includes the arcuate surface 333, and the second seat 341 includes the arcuate surface 343. As such, because of the shape and positioning of the arcuate surfaces 333 and 343, the first seat 331 and the second seat 341 may be able to move with respect to each other within the housing 303. For example, with the arrangement of the seats 331 and 341, the second seat 341 may be able to move along the axis 307 extending through the housing 303, such as being able to move only along the axis 307 extending through the housing 303, and the first seat 331 may be able to precess with respect to the axis 307 extending through the housing 303. Particularly, the movement of the first seat 331 may be decoupled from the movement of the second seat 341, in which the first seat 331 may be able to precess with respect to the second seat 341 and the housing 303 such that the first seat 331 may be able to change the orientation of an axis of the first seat 331.

Figure 2A:
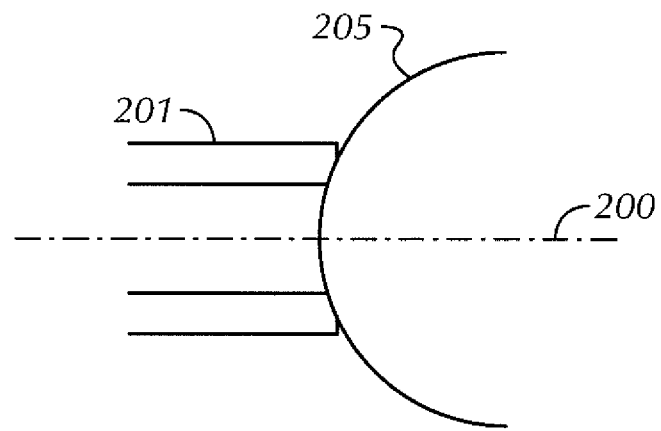
FIGS. 2A and 2B show cross-sectional views of a ball valve assembly.
Figure 2B:
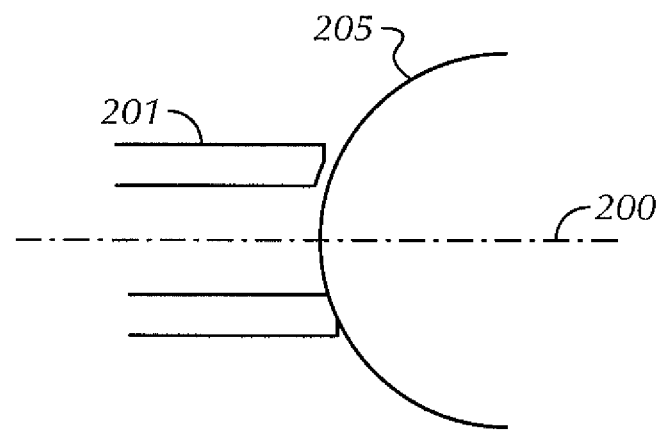

As previously discussed, particularly with respect to FIGS. 2A and 2B, a valve ball within a valve assembly may shift such as to lose or compromise the sealing engagement between a seat within the valve assembly and the valve ball. This is shown particularly in FIG. 2B. However, in accordance with one or more embodiments disclosed herein, because the first seat within the valve assembly of the present disclosure may be able to precess with respect to second seat and valve ball of the valve assembly, the first seat may be able to maintain sealing engagement with the valve ball, despite the valve ball moving and shifting within the valve assembly.

Figure 4:
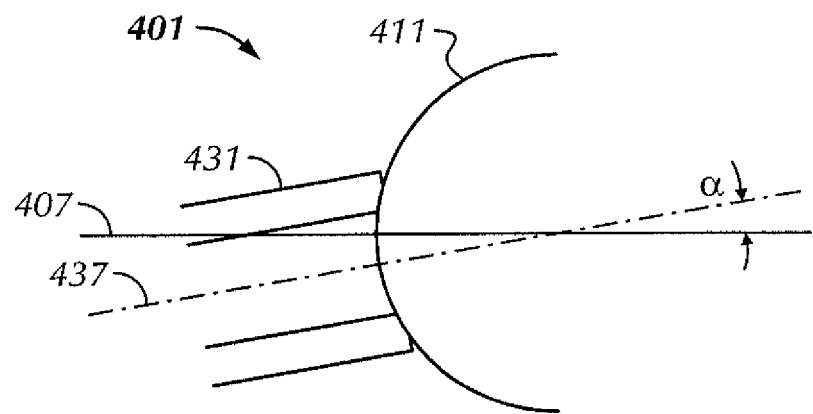
FIG. 4 shows a cross-sectional view of a valve assembly in accordance with embodiments disclosed herein.

Referring now to FIG. 4, a cross-sectional view of a valve assembly 401 in accordance with embodiments disclosed herein is shown. The valve assembly 401 includes the first seat 431 disposed adjacent to the valve ball 411, in which the housing of the valve assembly 401 has the axis 407 extending therethrough and the first seat 431 has an axis 437 extending therethrough. As mentioned above, in accordance with embodiments disclosed herein, when the valve ball shifts within the valve assembly, the first seat may precess to maintain sealing engagement with the valve ball. As such, and as shown in FIG. 4, the first seat 431 may precess with respect to the axis 407 of the housing such that the first seat 431 may maintain sealing engagement with the valve ball 411.

In FIG. 4, the first seat 431 is shown as precessing by a degrees between the axis 407 of the housing and the axis 437 extending through the first seat 431. Accordingly, in one embodiment, the first seat may be able to precess up to about 5 degrees with respect to the axis extending through the housing. Further, in another embodiment, the first seat may be able to precess up to about 1 degree with respect to the axis extending through the housing. However, those having ordinary skill in the art will appreciate that the present disclosure is not limited to the values and ranges discussed above. Further, though the movement between the valve ball 411 and the first seat 431 may be exaggerated and not drawn to scale in FIG. 4, this type of movement and shifting may demonstrate interaction and engagement between the valve ball 411 and the first seat 431.

As such, in accordance with one or more embodiments disclosed herein, the first seat and the second seat may be able to work with each other and/or have coordinated movements together such that, as the valve ball moves within the valve assembly, the first seat and the second seat may be able to move in conjunction with each other such as to be able to properly sealingly engage with the valve ball of the valve assembly. In one embodiment, the first seat and the second seat may need to move, such as by having the first seat precess and the second seat move axially with respect to an axis extending through the housing of the valve assembly. In another embodiment, only the first seat or the second seat may need to move. Accordingly, the movement of the first seat and the second seat may correspond to the movement of the valve ball such that the valve assembly desirably forms sealing engagement therein.

Further, in accordance with one or more embodiments disclosed herein, because the first seat may be able to precess with respect to the housing and the second seat of the valve assembly, a stop shoulder may be included within the housing to limit the precess of the first seat with respect to other components within the valve assembly. For example, as shown in FIGS. 3D and 3E, a stop shoulder 339 may be included within the valve assembly 301, and particularly disposed upon and/or attached to the first seat 331 in this embodiment, such that the stop shoulder 339 is configured to limit the precession of the first seat 331 with respect to the second seat 341 and/or other components within the valve assembly 301. In this embodiment, the stop shoulder 339 may be used to engage the second seat 341 to limit the precession of the first seat 331 with respect to the second seat 341. Further, the stop shoulder 339 may be used to keep the first seat 331 in a desired position relative to the valve ball 311. For example, the first seat 331 may move with the valve ball 311 with respect to the second seat 341. As such, the stop shoulder 339 may be used to prevent the first seat 331 from un-desired movement, such as by having the first seat 331 from over rotating with respect to the second seat 341 as the valve ball 311 rotates. Additionally, those having ordinary skill in the art will appreciate that other structures and arrangements may be used to limit the precession movement of the first seat without departing from the scope of the present disclosure.

To further develop and improve the sealing contact and capabilities of a valve assembly in accordance with one or more embodiments disclosed herein, one or more components of the valve assembly may be mate lapped, such as by hand and/or by a machine process, to enhance the sealing contact between the components. For example, The first seat 331 and the second seat 341 may be mate lapped together, and/or the first seat 331 and the valve ball 311 may be mate lapped together. The components of the valve assembly 301 that are mate lapped may develop a metal-to-metal seal for the sealing contact therebetween. As such, if desired, mate lapping sealing surfaces of the valve assembly may enhance the metal-to-metal seals formed within the valve assembly.

Further, one or more components within the valve assembly may be coated, such as having a hard coating formed thereon or applied thereto. For example, at least a portion of the valve ball, housing, first seat, and/or second seat may have a hard coating disposed thereon. This hard coating may be used to increase strength, durability, and/or wear resistance of the components the hard coating is applied upon. As such, one or more components of the valve assembly, such as within one or more of the metal-to-metal seals, may have a hard coating applied thereto.

Further, in accordance with one or more embodiments of the present disclosure, a metal-to-metal seal may include a coating, such as a hard coating, carbide coating, or any other coating known in the art, and/or may include alternative materials disposed thereon and/or disposed therebetween one or more components of the present disclosure. As such, the present disclosure contemplates the use of multiple coatings and/or materials therein in accordance with one or more embodiments disclosed herein.

Referring still to FIGS. 3A-3E, the valve assembly 301 includes the first seat 331 and the second seat 341 disposed on one side of the valve ball 311 within the housing 303. As such, to improve the sealing capability and utility of the valve assembly 301, one or more seats may also be disposed on another side of the valve ball 311 with respect to the first seat 331. For example, as shown in FIGS. 3B and 3C, particularly, a third seat 381 and/or a fourth seat 391, similar in structure and arrangement to the first seat 331 and the second seat 341, respectively, may be disposed on an opposite of the valve ball 311 with respect to the first seat 331. As such, in one embodiment, during one direction of fluid flow within the valve assembly 301, the valve ball 311 may be configured to form a metal-to-metal seal with the first seat 331, and during the other direction of fluid flow within the valve assembly 301, the valve ball 311 may be configured to form a metal-to-metal seal with the third seat 391. Those having ordinary skill in the art, however, will appreciate that other arrangements and/or designs for the seats may be used within the valve assembly without departing from the scope of the present disclosure.

In embodiments in which the valve assembly includes a biasing mechanism, such as a Belleville washer, the biasing mechanism may be disposed within the housing in a partially compressed state. For example, with reference to FIGS. 3B-3E, the biasing mechanism 351 may be partially compressed such that the biasing mechanism 351 may apply a biasing force against the first seat 331 and/or the second seat 341. As such, this may enable the first seat 331 to translate and apply the biasing force against the valve ball 311.

Figure 5:
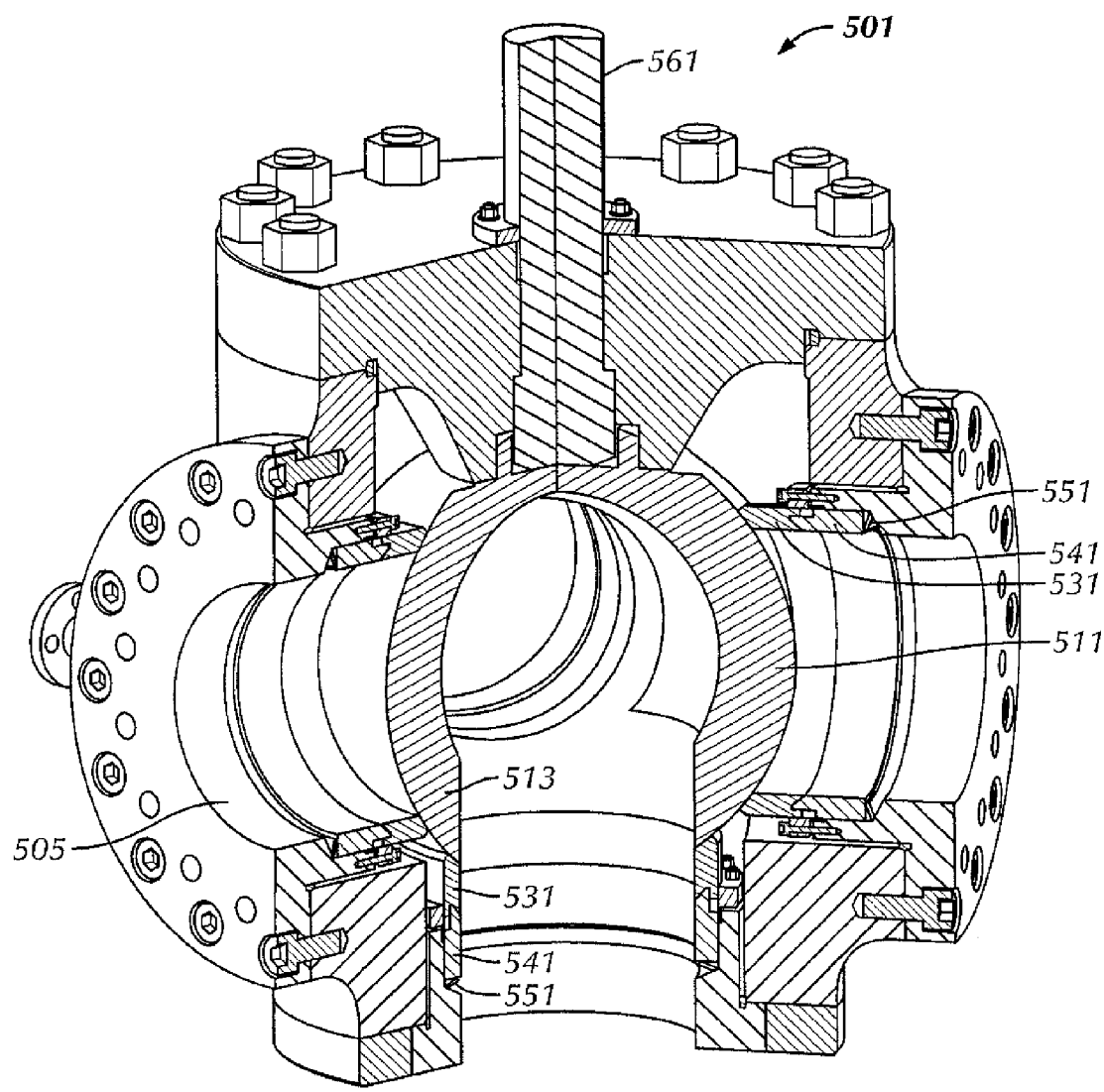
FIG. 5 shows a perspective view of a valve assembly in accordance with embodiments disclosed herein.

Referring now to FIG. 5, a perspective view of a valve assembly 501 in accordance with one or more embodiments disclosed herein is shown. The valve assembly 501 is similar to the valve assembly 301 in FIGS. 3A-3E, however the valve assembly 501 in FIG. 5 includes multiple ports and outlets, such as a 3-way valve assembly 501 as shown, as compared to the bi-directional valve assembly 301 shown in FIGS. 3A-3E. In FIG. 5, the valve assembly 501 may include a valve ball 511 and one or more passages 505 to have fluid received therein and/or directed out therethrough. Further, multiple seats may be disposed adjacent to the valve ball 511 on different sides of the valve ball 511 to provide sealing engagement therewith. In this embodiment, one or more different sides of the valve ball 511, a first seat 531 and a second seat 541 with a biasing mechanism 551 may be included with the valve assembly 501, similar in structure and arrangement to the valve assembly 301. As such, the present disclosure contemplates a valve assembly having one or more pairs of seats therein, in which one or more arcuate surfaces may be included within one or more of the pairs of seats within the valve assembly. Accordingly, those having ordinary skill in the art will appreciate that the present disclosure contemplates multiple arrangements, configurations, and embodiments for a valve assembly having at least a first seat and a second seat, in which at least one of the sealing surfaces of the first seat and the second seat includes an arcuate surface.

Embodiments of the present disclosure may have one or more of the following advantages. First, embodiments disclosed herein may provide for a valve assembly that may be used to inhibit fluid flow in one or more directions, such as in the downstream direction and/or the upstream direction. This sealing capability of the valve assembly may increase the functionality and reliability of the assembly to seal in the upstream direction. Next, embodiments disclosed herein may provide for a valve assembly that may be able to adjust and provide sealing capability despite shifting and/or movement of a valve ball within the valve assembly. As such, one or more of the seats within the valve assembly may be able to precess within the valve assembly to adjust and compensate for movement of the valve ball.

Further, embodiments in accordance with the present disclosure may be designed such as to replace one or more components of existing valve assemblies. For example, an existing valve assembly having a valve body, a first seat, a valve ball, a second seat, and a biasing mechanism may have one or more components replaced. Particularly, the seat and the biasing mechanism in such an embodiment may be replaced with a spring, a seat, and a second seat in accordance with embodiments of the present disclosure. As such, this may enable existing valve assemblies to be modified such that the valve assembly may have bi-directional sealing capability and inhibit fluid flow in both the downstream and upstream directions.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the invention should be limited only by the attached claims.

What is claimed is:

1. A valve assembly comprising:
   a housing having a passage formed therethrough;
   a valve ball comprising metal having a through hole and disposed in the housing, wherein the valve ball is rotatable between an open position that has the through hole substantially aligned with the passage and a closed position that has the through hole substantially misaligned with the passage;
   a first seat comprising metal having a first sealing surface and disposed in the housing adjacent to the valve ball; and
   a second seat comprising metal having a second sealing surface and disposed in the housing adjacent to the first seat such that the first sealing surface of the first seat is disposed adjacent to the second sealing surface of the second seat,
   wherein the first sealing surface of the first seat comprises a first arcuate surface and the second sealing surface of the second seat comprises a second arcuate surface,
   wherein the valve ball and the first seat form a first metal-to-metal seal therebetween and are mate lapped together, and
   wherein the first seat and the second seat form a second metal-to-metal seal therebetween and are mate lapped together.

2. The valve assembly of claim 1, wherein the at least one of the first sealing surface of the first seat and the second sealing surface of the second seat comprise a spherical surface.

3. The valve assembly of claim 1, wherein at least one of the first seat and the second seat is biased towards the valve ball.

4. The valve assembly of claim 3, further comprising a biasing mechanism disposed, at least partially, between the housing and the second seat, wherein the biasing mechanism biases the at least one of the first seat and the second seat towards the valve ball.

5. The valve assembly of claim 4, wherein the biasing mechanism comprises a Belleville washer.

6. The valve assembly of claim 1, wherein the first seat is configured to provide angular movement with respect to an axis extending through the housing, and wherein the second seat is configured to move along the axis extending through the housing.

7. The valve assembly of claim 6, wherein the first seat is configured to provide angular movement up to about 5 degrees with respect to the axis extending through the housing.

8. The valve assembly of claim 7, wherein the first seat is configured to provide angular movement up to about 1 degree with respect to the axis extending through the housing.

9. The valve assembly of claim 6, further comprising a stop shoulder disposed within the housing such that the stop shoulder is configured to limit the angular movement of the first seat with respect to the axis extending through the housing.

10. The valve assembly of claim 9, wherein the stop shoulder is attached to the first seat.

11. The valve assembly of claim 1, further comprising a sealing element disposed between the first sealing surface of the first seat and the second sealing surface of the second seat.

12. The valve assembly of claim 1, further comprising a sealing element disposed between the second seat and the housing.

13. The valve assembly of claim 1, further comprising:
    a third seat, wherein the third seat is disposed on another side of the valve ball with respect to the first seat,
    wherein, during one direction of fluid flow, the valve ball is configured to form a metal-to-metal seal with the first seat, and during another direction of fluid flow, the valve ball is configured to form a metal-to-metal seal with the third seat.

14. A valve assembly comprising:
    a housing having a passage formed therethrough about a first axis;
    a valve ball comprising metal having a through hole formed therethrough about a second axis, wherein the valve ball is configured to rotate between an open position such that the first axis of the housing is substantially aligned with the second axis of the valve ball and a closed position such that the first axis of the housing is substantially misaligned with the second axis of the valve ball;
    a stem extending through an opening formed in the housing and coupled to the valve ball such that the stem is configured to rotate the valve ball between the open position and the closed position;
    a first seat comprising metal having a first sealing surface and disposed in the housing adjacent to the valve ball on one side of the valve ball;
    a second seat comprising metal having a second sealing surface and disposed in the housing adjacent to the first seat such that the first sealing surface of the first seat is disposed adjacent to the second sealing surface of the second seat,
    wherein the first sealing surface of the first seat comprises a first arcuate surface and the second sealing surface of the second seat comprises a second arcuate surface,
    wherein the valve ball and the first seat form a first metal-to-metal seal therebetween and are mate lapped together, and
    wherein the first seat and the second seat form a second metal-to-metal seal therebetween and are mate lapped together.

15. The valve assembly of claim 14, wherein the at least one of the first sealing surface of the first seat and the second sealing surface of the second seat comprise a spherical surface.

16. The valve assembly of claim 14, further comprising a biasing mechanism disposed, at least partially, between the housing and the second seat, wherein the biasing mechanism biases at least one of the first seat and the second seat towards the valve ball.

17. The valve assembly of claim 14, further comprising:
    a third seat, wherein the third seat is disposed on another side of the valve ball with respect to the first seat, wherein, during one direction of fluid flow, the valve ball is configured to form a metal-to-metal seal with the first seat, and during another direction of fluid flow, the valve ball is configured to form a metal-to-metal seal with the third seat.

18. The valve assembly of claim 14, wherein the first seat is configured to provide angular movement with respect to the first axis extending through the housing, and wherein the second seat is configured to move along the first axis extending through the housing.

19. A method to manufacture a valve assembly, the method comprising:
disposing a first seat comprising metal having a first sealing surface in a housing, the housing having a passage formed therethrough;
disposing a second seat comprising metal having a second sealing surface in the housing adjacent to the first seat such that the first sealing surface of the first seat is adjacent to the second sealing surface of the second seat, wherein the first sealing surface of the first seat comprises a first arcuate surface and the second sealing surface of the second seat comprises a second arcuate surface; and
disposing a valve ball comprising metal having a through hole formed therein in the housing adjacent to the first seat such that the valve ball is rotatable within the housing between an open position that has the through hole substantially aligned with the passage and a closed position that has the through hole substantially misaligned with the passage,
wherein the valve ball and the first seat form a first metal-to-metal seal therebetween and are mate lapped together, and
wherein the first seat and the second seat form a second metal-to-metal seal therebetween and are mate lapped together.

20. The method of claim 19, further comprising:
disposing a biasing mechanism, at least partially, between the housing and the second seat such that the biasing mechanism is configured to bias at least one of the first seat and the second seat towards the valve ball;
disposing a stem through an opening formed in the housing and coupling the stem to the valve ball such that the stem is configured to rotate the valve ball between the open position and the closed position; and
disposing a third seat on another side of the valve ball with respect to the first seat.

21. The method of claim 20, wherein, during one direction of fluid flow, the valve ball is configured to form a metal-to-metal seal with the first seat, and during another direction of fluid flow, the valve ball is configured to form a metal-to-metal seal with the third seat.

22. The method of claim 19, wherein the first seat is configured to provide angular movement with respect to the first axis extending through the housing, and wherein the second seat is configured to move along the first axis extending through the housing.

23. The method of claim 19, wherein the at least one of the first sealing surface of the first seat and the second sealing surface of the second seat comprise a spherical surface.

* * * * *